United States Patent
Wang et al.

(10) Patent No.: US 12,015,519 B2
(45) Date of Patent: Jun. 18, 2024

(54) DATA PROCESSING METHOD AND APPARATUS, AND COMPUTER STORAGE MEDIUM

(71) Applicant: HUAWEI TECHNOLOGIES CO., LTD., Shenzhen (CN)

(72) Inventors: Zhongyu Wang, Nanjing (CN); Yuming Xie, Nanjing (CN); Wei Song, Nanjing (CN); Zhenwei Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/691,736

(22) Filed: Mar. 10, 2022

(65) Prior Publication Data
US 2022/0200844 A1 Jun. 23, 2022

Related U.S. Application Data (63) Continuation of application No. PCT/CN2019/117248, filed on Nov. 11, 2019.

(30) Foreign Application Priority Data

Sep. 11, 2019 (CN) .......................... 201910860877.0

(51) Int. Cl.
*H04L 41/0677* (2022.01)
*H04L 41/0631* (2022.01)
(Continued)

(52) U.S. Cl.
CPC ...... *H04L 41/0677* (2013.01); *H04L 41/0631* (2013.01); *H04L 41/12* (2013.01); *H04L 41/145* (2013.01)

(58) Field of Classification Search
CPC ........... H04W 52/0212; H04L 41/0677; H04L 41/0631; H04L 41/12; H04L 41/145
(Continued)

(56) References Cited

U.S. PATENT DOCUMENTS

2009/0055684 A1  2/2009  Jamjoom et al.
2015/0312774 A1  10/2015  Lau
(Continued)

FOREIGN PATENT DOCUMENTS

CN  105871612 A  8/2016
CN  107749803 A  3/2018
(Continued)

OTHER PUBLICATIONS

Li Xinpeng et al., "Construction and Application of Knowledge Graph of Power Dispatching Automation System",Dec. 8, 2018. total:9pages.

*Primary Examiner* — David R Lazaro
*Assistant Examiner* — Zia Khurshid
(74) *Attorney, Agent, or Firm* — Rimon PC (57) ABSTRACT

A management device obtains network data of a target network. The network data includes a network topology of the target network and device information of a plurality of network devices in the target network, and the device information includes one or more of interface configuration information, protocol configuration information, and service configuration information. The management device extracts a plurality of knowledge graph triplets from the network data. Each knowledge graph triplet includes two network entities and a relationship between the two network entities. The type of the network entity may be a network device, an interface, a protocol, or a service. The management device generates a knowledge graph of the target network based on the plurality of knowledge graph triplets. The knowledge (Continued)

graph of the target network can be used to visualize the network data.

14 Claims, 7 Drawing Sheets

(51) Int. Cl.
*H04L 41/12* (2022.01)
*H04L 41/14* (2022.01)

(58) Field of Classification Search
USPC .......................................................... 709/224
See application file for complete search history.

(56) References Cited

U.S. PATENT DOCUMENTS

| | | | |
|---|---|---|---|
| 2019/0097871 A1* | 3/2019 | Tee | .......................... H04L 41/16 |
| 2019/0213259 A1* | 7/2019 | Bacarella | .............. H04L 67/104 |

FOREIGN PATENT DOCUMENTS

| | | |
|---|---|---|
| CN | 109347798 A | 2/2019 |
| CN | 109815230 A | 5/2019 |
| CN | 109922075 A | 6/2019 |
| CN | 110008288 A | 7/2019 |
| CN | 110083744 A | 8/2019 |

\* cited by examiner

DATA PROCESSING METHOD AND APPARATUS, AND COMPUTER STORAGE MEDIUM

CROSS-REFERENCE TO RELATED APPLICATIONS

This application is a continuation of International Application No. PCT/CN2019/117248, filed on Nov. 11, 2019, which claims priority to Chinese Patent Application No. 201910860877.0, filed on Sep. 11, 2019. The disclosures of the aforementioned applications are hereby incorporated by reference in their entireties.

TECHNICAL FIELD

This application relates to the field of network technologies, and in particular, to a data processing method and apparatus, and a computer storage medium.

BACKGROUND

With the continuous expansion of network scales, the amount of network data keeps increasing in a communication network. How to obtain valuable network information from the massive amount of network data has become a problem for all personnel in various fields.

Currently, technical personnel may obtain network information in a communication network by manually querying a command line. For example, when needing to query a routing protocol supported by an interface of a network device, the technical personnel may query a command line corresponding to an interface configuration of the network device. However, querying the command line to obtain the network information is inefficient.

SUMMARY

This application provides a data processing method and apparatus, and a computer storage medium, to solve the current problem that obtaining network information is inefficient.

According to a first aspect, a data processing method is provided. A management device obtains network data of a target network, where the network data includes a network topology of the target network and device information of a plurality of network devices in the target network, and the device information includes one or more of interface configuration information, protocol configuration information, and service configuration information. The management device extracts a plurality of knowledge graph triplets from the network data, where each knowledge graph triplet includes two network entities and a relationship between the two network entities, and a type of the network entity is a network device, an interface, a protocol, or a service. The management device generates a knowledge graph of the target network based on the plurality of knowledge graph triplets.

In this application, after obtaining the network data of the target network, the management device processes the network data, to generate the knowledge graph of the target network. The knowledge graph of the target network can intuitively reflect the network entities in the target network and the relationships among different network entities, that is, the knowledge graph can be used to visualize the network data. When needing to obtain network information in the target network, a user only needs to view the knowledge graph of the target network without manually querying a command line. Therefore, the efficiency of obtaining the network information by the user is improved.

Optionally, the device information further includes a routing entry. That is, the management device may extract the knowledge graph triplets from network configuration information of the network device, or may obtain the knowledge graph triplets based on the routing entry of the network device.

Optionally, the relationship between the two network entities is a dependency relationship, a subordinate relationship, or an equivalence relationship.

Optionally, after the management device generates the knowledge graph of the target network, when a fault occurs in the target network, the management device may further obtain abnormal events generated in the target network, and identify, on the knowledge graph of the target network, the abnormal network entities that generated the abnormal events in the target network.

In this application, after identifying the abnormal network entities on the knowledge graph of the target network, the management device may send the knowledge graph of the target network to an OSS or a terminal device connected to the management device, so that the OSS or the terminal device displays the knowledge graph. This helps an operation and maintenance engineer view the abnormal network entities in the target network. The management device may further send the abnormal events corresponding to the abnormal network entities to the OSS or the terminal device connected to the management device, so that the OSS or the terminal device can display the abnormal events. This helps an operation and maintenance engineer obtain the abnormal types of the abnormal network entities.

Optionally, the abnormal event includes one or more of an alarm log, a status change log, and an abnormal key performance indicator.

Optionally, after the management device identifies, on the knowledge graph of the target network, the abnormal network entities that generated the abnormal events in the target network, the management device may further determine one or more root-cause fault network entities from the abnormal network entities on the knowledge graph of the target network based on a fault propagation relationship among network entities, and identify the one or more root-cause fault network entities on the knowledge graph of the target network.

Optionally, the management device may obtain a plurality of knowledge graph samples, where each knowledge graph sample is identified with the abnormal network entities that generate, when a fault occurs in the network to which the knowledge graph sample belongs, abnormal events in the network to which the knowledge graph sample belongs and a root-cause fault network entity. The management device determines the fault propagation relationship based on the plurality of knowledge graph samples.

In this embodiment of this application, the management device may learn the fault propagation relationship among network entities by using the plurality of knowledge graph samples, and determine, based on the fault propagation relationship, the root-cause fault network entity in the abnormal network entities on the knowledge graph of the target network. This implements automated inference and locating of a network fault root cause.

Optionally, the network to which the knowledge graph sample belongs is the target network, or the network to which the knowledge graph sample belongs is another network of the same network type as the target network.

Optionally, the process in which the management device extracts the plurality of knowledge graph triplets from the network data includes:

The management device extracts the plurality of knowledge graph triplets from the network data based on an abstract service model corresponding to the network type of the target network, where the abstract service model is used to represent the relationships among different network entities.

According to a second aspect, a data processing apparatus is provided. The apparatus includes a plurality of functional modules, and the plurality of functional modules interact with each other to implement the method according to the first aspect and the implementations of the first aspect. The plurality of functional modules may be implemented based on software, hardware, or a combination of software and hardware, and the plurality of functional modules may be randomly combined or divided based on specific implementation.

According to a third aspect, a data processing apparatus is provided. The apparatus includes a processor and a memory, where the memory is configured to store a computer program, where the computer program includes program instructions; and the processor is configured to invoke the computer program to implement the data processing method according to any implementation of the first aspect.

According to a fourth aspect, a computer storage medium is provided. The computer storage medium stores instructions; and when the instructions are executed by a processor, the data processing method according to any implementation of the first aspect is implemented.

According to a fifth aspect, a chip is provided. The chip includes a programmable logic circuit and/or program instructions. When the chip runs, the data processing method according to any implementation of the first aspect is implemented.

Beneficial effects brought by the technical solutions provided in this application include at least the following:

After obtaining the network data of the target network, the management device processes the network data, to generate the knowledge graph of the target network. The knowledge graph of the target network can intuitively reflect the network entities in the target network and the relationships among different network entities, that is, the knowledge graph can be used to visualize the network data. When needing to obtain the network information in the target network, the user only needs to view the knowledge graph of the target network without manually querying the command line. Therefore, the efficiency of obtaining the network information by the user is improved. In addition, after a fault occurs in the target network, the management device may further identify the abnormal network entities on the knowledge graph of the target network, to intuitively reflect abnormal locations in the target network. Further, the management device may further determine the root-cause fault network entity in the abnormal network entities on the knowledge graph of the target network based on the fault propagation relationship among network entities, to implement the automated inference and locating of the network fault root cause.

DESCRIPTION OF EMBODIMENTS

To make objectives, technical solutions, and advantages of this application clearer, the following further describes implementations of this application in detail with reference to the accompanying drawings.

Figure 1:
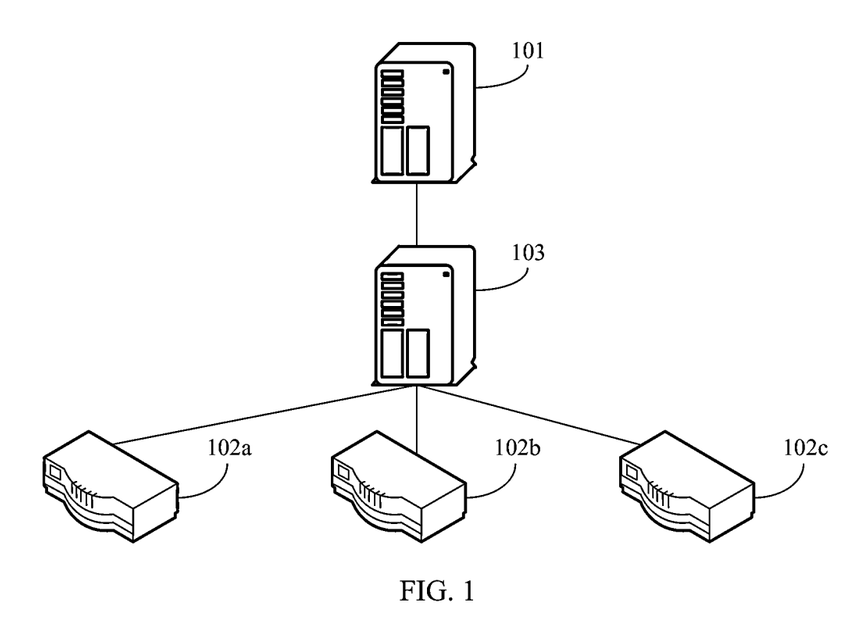
FIG. 1 is a schematic diagram of an application scenario of a data processing method according to an embodiment of this application.

FIG. 1 is a schematic diagram of an application scenario of a data processing method according to an embodiment of this application. As shown in FIG. 1, the application scenario includes a management device 101 and network devices 102a to 102c (collectively referred to as network devices 102) in a communication network. Quantities of management devices and network devices in FIG. 1 are merely used as an example, and are not used as a limitation on the application scenario of the data processing method provided in embodiments of this application. The communication network may be a data center network (DCN), a metropolitan area network, a wide area network, a campus network, a virtual local area network (VLAN), a virtual extensible local area network (VXLAN), or the like. The type of the communication network is not limited in embodiments of this application.

Optionally, the management device 101 may be one server or a server cluster including several servers, or may be a cloud computing service center. The network device 102 may be a switch, a router, or the like. Optionally, still refer to FIG. 1. The application scenario may further include a control device 103. The control device 103 is configured to manage and control the network device 102 in the communication network. The management device 101 is connected to the control device 103 through a wired network or a wireless network, and the control device 103 is connected to the network device 102 through a wired network or a wireless network. The control device 103 may be a network controller, a network management device, a gateway, or another device having a control capability. The control device 103 may be one or more devices.

The control device 103 may store a network topology of the communication network managed by the control device 103. The control device 103 is further configured to collect device information of the network device 102 in the communication network, abnormal events generated in the communication network, and the like, and provide the management device 101 with the network topology of the communication network, the device information of the network device 102, the abnormal events generated in the communication network, and the like. The device information of the network device includes network configuration information, a routing entry, and/or the like of the network device. The network configuration information usually includes interface configuration information, protocol configuration information, service configuration information, and the like. Optionally, the control device 103 may periodically collect the device information of the network device 102 and the abnormal events generated in the communication network. Alternatively, when the device information of the network device 102 changes, the network device 102 actively reports changed device information to the control device 103. When a fault occurs in the communication network, the network device 102 actively reports a generated abnormal event to the control device 103. Certainly, in some application scenarios, the management device may alternatively be directly connected to the network device in the communication network. In other words, the application scenarios may not include the control device. This is not limited in embodiments of this application.

Figure 2:
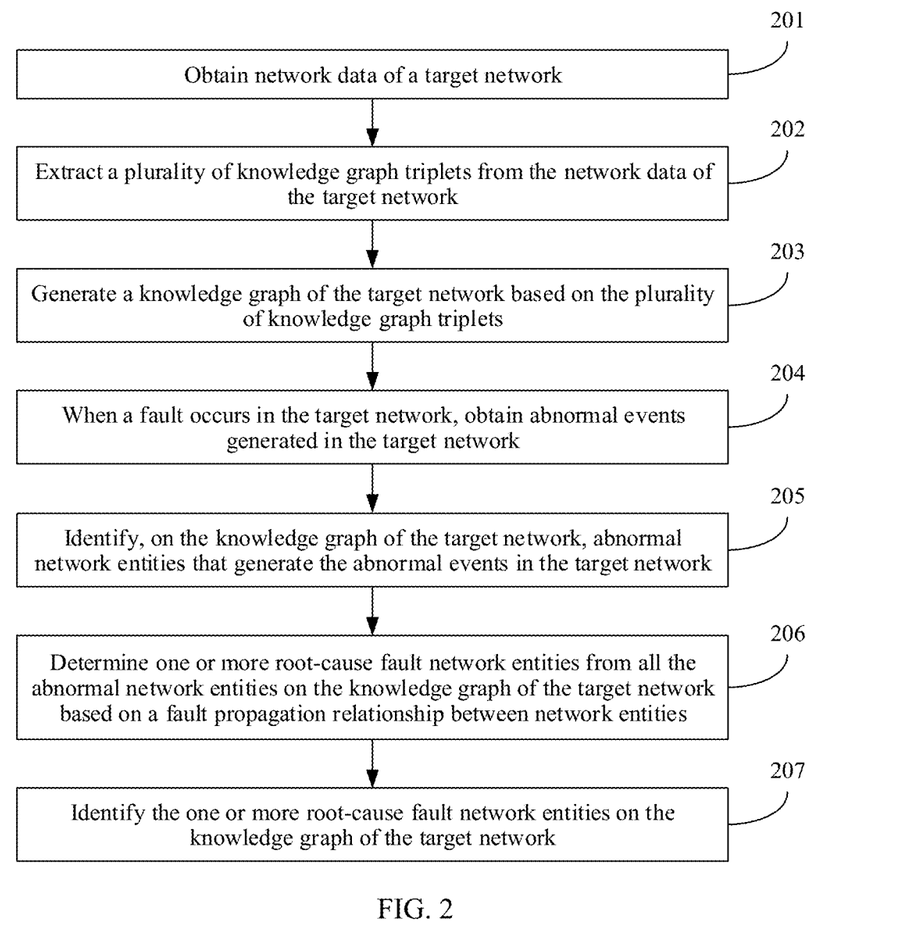
FIG. 2 is a flowchart of a data processing method according to an embodiment of this application.

FIG. 2 is a flowchart of a data processing method according to an embodiment of this application. The data processing method may be applied to the management device 101 in the application scenario shown in FIG. 1. As shown in FIG. 2, the method includes the following steps.

Step 201: Obtain network data of a target network.

The network data includes a network topology of the target network and device information of a plurality of network devices in the target network. The device information of the network device includes network configuration information of the network device, and specifically includes one or more of interface configuration information, protocol configuration information, and service configuration information. The device information may further include a routing entry and the like. Optionally, the interface configuration information of the network device includes an Internet Protocol (IP) address of an interface, a protocol type supported by the interface, a service type supported by the interface, and the like. The protocol configuration information of the network device includes an identifier of a protocol, where the identifier of the protocol is used to uniquely identify the protocol, and may be represented by a character, a letter, a digit, and/or the like. The service configuration information of the network device includes a service used by the network device, for example, a virtual private network (VPN) service and/or a dynamic host configuration protocol (DHCP) service.

Optionally, an implementation process of step 201 includes: The management device receives the network data of the target network that is sent by a control device of the target network.

Step 202: Extract a plurality of knowledge graph triplets from the network data of the target network.

Each knowledge graph triplet includes two network entities and a relationship between the two network entities. For example, the relationship between the two network entities may be a dependency relationship, a subordinate relationship, or an equivalence relationship.

In embodiments of this application, a type of the network entity may be a network device, an interface, a protocol, or a service. For example, when two network entities on a knowledge graph triplet are a network device and an interface, the relationship between the two network entities is a subordinate relationship, that is, the interface belongs to the network device. For another example, when two network entities on a knowledge graph triplet are two interfaces between which a communication connection is established, the relationship between the two network entities is an equivalence relationship.

Optionally, a network entity whose type is a network device may be represented by a name, a media access control (MAC) address, or a hardware address of the network device, or another identifier that can uniquely identify the network device. A network entity whose type is an interface may be represented by a name of the interface. A network entity whose type is a protocol may be represented by an identifier of the protocol. The knowledge graph triplet is represented in a graph form. The knowledge graph triplet includes two basic elements, namely, a point and an edge, where the point represents a network entity, and the edge represents a relationship between two network entities. The edge on the knowledge graph triplet may be directional or directionless. The edge on the knowledge graph triplet may be further used to indicate a specific relationship, for example, a dependency relationship, a subordinate relationship, or an equivalence relationship, between two network entities. For example, when two network entities are in an equivalence relationship, a directionless edge may be used to connect the two network entities. When two network entities are in a dependency relationship or a subordinate relationship, a directional edge (for example, an arrow) may be used to connect the two network entities, and the directional edge points from a depending network entity to a depended network entity, or the directional edge points from a belonging network entity to a belonged network entity.

Figure 3:
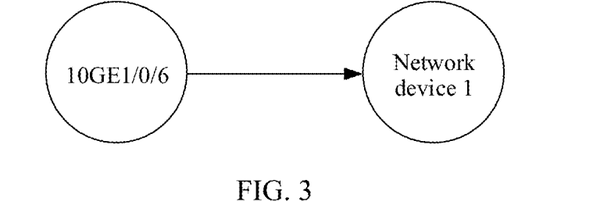
FIG. 3 is a schematic diagram of a knowledge graph triplet according to an embodiment of this application.

For example, assuming that the network data obtained by the management device includes a piece of data that "a network device 1 has an interface named "10GE1/0/6"", the management device may extract a knowledge graph triplet shown in FIG. 3. Refer to FIG. 3. On the knowledge graph triplet, types of two network entities are respectively a network device and an interface, and an arrow points from the interface to the network device. This indicates that the interface named "10GE1/0/6" belongs to the network device 1, in other words, the knowledge graph triplet can reflect that the network device 1 has the interface named "10GE1/0/6".

Optionally, an implementation process of step 202 includes: The management device extracts the plurality of knowledge graph triplets from the network data based on an abstract service model corresponding to a network type of the target network, where the abstract service model is used to reflect relationships among different network entities. Different network types may correspond to different abstract service models. The abstract service model is essentially a data object used to define a dependency relationship between different network entities. For example, it may be defined in the abstract service model that, each network device has one or more interfaces, in other words, the interface belongs to the network device; the interface may carry a forwarding service, for example, the interface may carry a layer 3 IP forwarding service, and this means that the interface supports packet forwarding using an interior gateway protocol (IGP), in other words, the layer 3 IP forwarding service or the IGP depends on the interface; the layer 3 IP forwarding service may carry a VXLAN tunnel, a traffic engineering (TE) tunnel, and a border gateway protocol (BGP), in other words, the VXLAN tunnel, the TE tunnel, and the BGP depend on the layer 3 IP forwarding service; the TE tunnel may carry a VPN service, in other words, the VPN service depends on the TE tunnel; and so on. That the layer 3 IP forwarding service may carry the VXLAN tunnel indicates that an interface that carries the layer 3 IP forwarding service may be used as an endpoint of the VXLAN tunnel. That the layer 3 IP forwarding service may carry the TE tunnel indicates that an interface that carries the layer 3 IP forwarding service may be used as an endpoint of the TE tunnel. That the layer 3 IP forwarding service may carry the BGP indicates that an interface that carries the layer 3 IP forwarding service may be configured to send and receive a BGP-based protocol packet. That the TE tunnel may carry the VPN service indicates that an interface that carries the TE tunnel may support the VPN service.

Optionally, the management device may extract the knowledge graph triplets from the network configuration information of the network device, or may obtain the knowledge graph triplets based on the routing entry of the network device.

For example, it is assumed that the content of the knowledge graph triplet extracted by the management device based on the network configuration information of the network device includes: The network device 1 has the interface named "10GE1/0/6"; the interface "10GE1/0/6" supports a layer 3 IP forwarding service, and an IP address of the interface "10GE1/0/6" is 192.168.1.1; and the network device 1 has a VXLAN tunnel, a source IP address of the VXLAN tunnel is 192.168.1.1, and a destination IP address of the VXLAN tunnel is 192.168. 10.1. To determine the relationship between the VXLAN tunnel and the interface, the management device may search the routing entry by using 192.168.10.1 as the destination IP address. If it is determined, based on the routing entry, that an outbound interface reaching the destination IP address is the interface "10GE1/0/6", the content of the knowledge graph triplet obtained by the management device based on the routing entry is: An endpoint of the VXLAN tunnel is located on the interface "10GE1/0/6" of the network device 1.

Step 203: Generate a knowledge graph of the target network based on the plurality of knowledge graph triplets.

Figure 4:
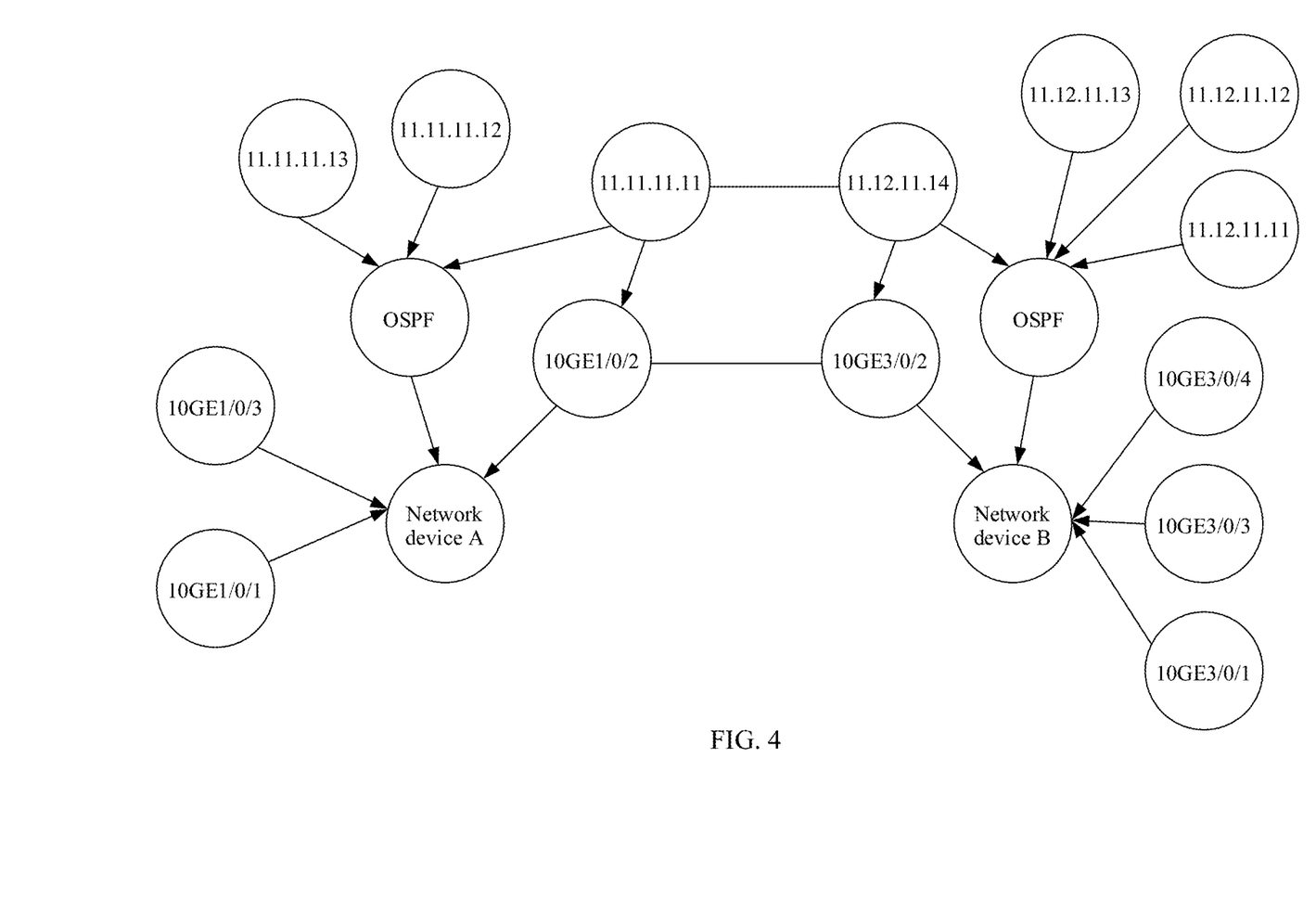
FIG. 4 is a schematic diagram of a knowledge graph according to an embodiment of this application.

For example, it is assumed that the target network includes two network devices: a network device A and a network device B. The network device A has three interfaces, and names of the three interfaces are: 10GE1/0/1, 10GE1/0/2, and 10GE1/0/3. The network device B has four interfaces, and names of the four interfaces are: 10GE3/0/1, 10GE3/0/2, 10GE3/0/3, and 10GE3/0/4. Both the network device A and the network device B support the open shortest path first (OSPF) protocol, where the OSPF protocol is an IGP. An identifier of the OSPF protocol on the network device A is represented by 10.89.46.25, and the OSPF protocol on the network device A includes three route IP addresses: 11.11.11.11, 11.11.11.12, and 11.11.11.13. An identifier of the OSPF protocol on the network device B is represented by 10.89.49.37, and the OSPF protocol on the network device B includes four route IP addresses: 11.12.11.11, 11.12.11.12, 11.12.11.13, and 11.12.11.14. The interface "10GE1/0/2" of the network device A is connected to the interface "10GE3/0/2" of the network device B, and the OSPF protocol is used for communication between the two interfaces. The interface "10GE1/0/2" of the network device A uses the route IP address 11.11.11.11, and the interface "10GE3/0/2" of the network device B uses the route IP address 11.12.11.14. Therefore, a knowledge graph shown in FIG. 4 may be obtained based on the foregoing network data. Refer to FIG. 4. Device information of the network device A and the network device B in the target network is expressed in a graph form on the knowledge graph.

Optionally, after generating the knowledge graph of the target network, the management device may send the knowledge graph of the target network to an operations support system (OSS) or a terminal device connected to the management device, so that the OSS or the terminal device displays the knowledge graph. Certainly, if the management device has a display function, the management device may alternatively directly display the knowledge graph of the target network on a display interface of the management device.

In this embodiment of this application, after obtaining the network data of the target network, the management device processes the network data, to generate the knowledge graph of the target network. The knowledge graph of the target network can intuitively reflect network entities in the target network and relationships among different network entities, that is, the knowledge graph can be used to visualize the network data. When needing to obtain network information in the target network, a user only needs to view the knowledge graph of the target network without manually querying a command line. Therefore, the efficiency of obtaining the network information by the user is improved.

Optionally, after generating the knowledge graph of the target network, the management device may further store the knowledge graph of the target network in the management device or a storage device connected to the management device for subsequent use. For example, the knowledge graph of the target network may be used as a basis for determining a fault propagation relationship between network entities and/or a basis for fault root cause inference.

Step 204: When a fault occurs in the target network, obtain abnormal events generated in the target network.

A fault occurring in the target network means that a fault occurs on a network device in the target network. Types of the fault on the network device include an interface fault, a protocol fault (including a failure to normally send or receive a protocol packet, and the like), a service fault, and the like. Optionally, the abnormal event includes one or more of an alarm log, a status change log, and an abnormal key performance indicator. The alarm log includes an identifier of an abnormal network entity in the network device and an alarm type. The status change log includes configuration file change information, routing entry change information, and/or the like. For example, the status change log may include information such as "an access sub-interface is deleted" and "a destination IP host route is deleted". The abnormal key performance indicator is used to describe an abnormal indicator of a network entity.

Step 205: Identify, on the knowledge graph of the target network, abnormal network entities that generated the abnormal events in the target network.

Optionally, the management device may determine the abnormal network entities based on the obtained abnormal events in the target network, and identify the abnormal network entities on the knowledge graph of the target network. An abnormal network entity and a normal network entity on the knowledge graph may be distinguished by using different patterns and/or different colors, or words such as "abnormal" may be marked near the abnormal network entity. The manner of identifying an abnormal network entity on the knowledge graph is not limited in this embodiment of this application.

Optionally, after identifying the abnormal network entities on the knowledge graph of the target network, the management device may send the knowledge graph of the target network to the OSS or the terminal device connected to the management device, so that the OSS or the terminal device displays the knowledge graph. This helps an operation and maintenance engineer view the abnormal network entities in the target network. The management device may further send the abnormal events corresponding to the abnormal network entities to the OSS or the terminal device connected to the management device, so that the OSS or the terminal device displays the abnormal events. This helps an operation and maintenance engineer obtain abnormal types of the abnormal network entities.

The knowledge graph generated in step 203 may also be referred to as an initial knowledge graph. The knowledge graph on which the abnormal network entities are identified in step 205 may also be referred to as a first knowledge graph.

Step 206: Determine one or more root-cause fault network entities from the abnormal network entities on the knowledge graph of the target network based on the fault propagation relationship among network entities.

A root-cause fault network entity is an abnormal network entity that is the root cause of a fault.

Optionally, a process in which the management device obtains the fault propagation relationship includes: The management device obtains a plurality of knowledge graph samples, where each knowledge graph sample is identified with the abnormal network entities that generate, when a fault occurs in a network to which the knowledge graph sample belongs, abnormal events in the network to which the knowledge graph sample belongs and a root-cause fault network entity. The management device determines the fault propagation relationship based on the plurality of knowledge graph samples. Each knowledge graph sample is a fault case, and the abnormal network entities and the root-cause fault network entity in the knowledge graph sample may be manually determined. Optionally, the management device may learn the fault propagation relationship in the plurality of knowledge graph samples by using a graph embedding algorithm or the like. Alternatively, when the probability that two network entities on the same knowledge graph triplet are simultaneously abnormal is greater than a threshold, the management device may determine that fault propagation is performed between the two network entities.

For example, on the knowledge graph shown in FIG. 4, when a fault occurs on the interface "10GE1/0/2" of the network device A, normal communication cannot be performed on the interface, and consequently the route IP address "11.12.11.14" used by the interface is unreachable. Therefore, the management device may obtain a fault propagation relationship: The fault of the interface causes the route IP address used by the interface to be unreachable. When the management device obtains a first abnormal event used to indicate the fault of the interface and a second abnormal event used to indicate that the route IP address used by the interface is unreachable, the management device determines that the first abnormal event is a root-cause abnormal event, and determines the interface as a root-cause fault network entity.

Optionally, the network to which the knowledge graph sample belongs is the target network, or the network to which the knowledge graph sample belongs is another network of the same network type as the target network. The plurality of knowledge graph samples may belong to the same network, or may belong to a plurality of networks. This is not limited in this embodiment of this application.

In this embodiment of this application, the management device may learn the fault propagation relationship among network entities by using the plurality of knowledge graph samples, and determine, based on the fault propagation relationship, the root-cause fault network entity in the abnormal network entities on the knowledge graph of the target network. This implements automated inference and locating of a network fault root cause.

Optionally, the fault propagation relationship among network entities may alternatively be determined by another device and then sent to the management device. For a manner in which another device determines the fault propagation relationship among network entities, refer to the foregoing manner in which the management device determines the fault propagation relationship among network entities. Details are not described herein in this embodiment of this application.

Step 207: Identify the one or more root-cause fault network entities on the knowledge graph of the target network.

Optionally, after identifying the root-cause fault network entity on the knowledge graph of the target network, the management device may send the knowledge graph of the target network to the OSS or the a terminal device connected to the management device, so that the OSS or the terminal device displays the knowledge graph. This helps an operation and maintenance engineer view the root-cause fault network entity in the target network and quickly locate the fault, thereby improving fault repair efficiency. That is, the time period that the management device takes to switch from a faulty state to a working state is shortened. The time period that the network device takes to switch from the faulty state to the working state may also be referred to as a mean time to repair (MTTR).

Optionally, in this embodiment of this application, the management device may include one device or a plurality of devices. When the management device includes one device, step 201 to step 207 are all performed by the device. Alternatively, when the management device includes a plurality of devices, for example, a first device and a second device, step 201 to step 205 and step 207 may be performed by the first device, and step 206 may be performed by the second device. To be specific, the first device generates the knowledge graph of the target network, and identifies the abnormal network entities on the knowledge graph of the target network; the first device sends the knowledge graph that is identified with the abnormal network entities to the second device; the second device determines the root-cause fault network entity from the abnormal network entities based on the fault propagation relationship among network entities; the second device sends an identifier of the root-cause fault network entity to the first device; and the first device identifies the root-cause fault network entity on the knowledge graph of the target network based on the received identifier of the root-cause fault network entity.

The sequence of the steps in the data processing method provided in this embodiment of this application may be properly adjusted, and a step may be correspondingly added or deleted based on a situation. For example, step 207 may alternatively not be performed. After determining the root-cause fault network entity on the knowledge graph of the target network, the management device directly outputs a root-cause abnormal event corresponding to the root-cause fault network entity. Any variation method readily figured out by a person skilled in the art within the technical scope disclosed in this application shall fall within the protection scope of this application. Therefore, details are not described herein.

In conclusion, according to the data processing method provided in this embodiment of this application, after obtaining the network data of the target network, the management device processes the network data, to generate the knowledge graph of the target network. The knowledge graph of the target network can intuitively reflect the network entities in the target network and the relationship among different network entities, that is, the knowledge graph can be used to visualize the network data. When needing to obtain the network information in the target network, the user only needs to view the knowledge graph of the target network without manually querying the command line. Therefore, the efficiency of obtaining the network information by the user is improved. In addition, after a fault occurs in the target network, the management device may further identify the abnormal network entities on the knowledge graph of the target network, to intuitively reflect abnormal locations in the target network. Further, the management device may further determine the root-cause fault network entity in the abnormal network entities on the knowledge graph of the target network based on the fault propagation relationship among network entities, to implement automated inference and locating of the network fault root cause.

It should be noted that the management device may include a plurality of devices that are separately configured to perform different steps. If two adjacent steps are performed by different devices, a device that performs a previous step sends the execution result of the previous step to a device that is to perform a next step. It is assumed that the management device includes a device A and a device B. In an implementation, steps 201 to 203 may be performed by the device A, and steps 204 to 207 are performed by the device B, where the device A sends the initial knowledge graph generated through steps 201 to 203 to the device B, and the device B performs steps 204 to 207 based on the initial knowledge graph received from the device A. In another implementation, steps 201 to 205 may be performed by the device A, and steps 206 and 207 are performed by the device B, where the device A sends the first knowledge graph generated through steps 201 to 205 to the device B, and the device B performs steps 206 and 207 based on the first knowledge graph received from device A.

Figure 5:
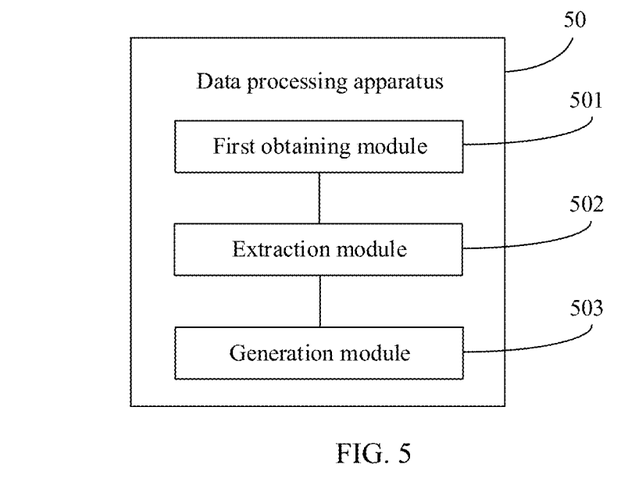
FIG. 5 is a schematic diagram of a structure of a data processing apparatus according to an embodiment of this application.

FIG. 5 is a schematic diagram of a structure of a data processing apparatus 50 according to an embodiment of this application. The data processing apparatus 50 may be applied to the management device 101 in the application scenario shown in FIG. 1. As shown in FIG. 5, the apparatus 50 includes:
    a first obtaining module 501, configured to obtain network data of a target network, where the network data includes a network topology of the target network and device information of a plurality of network devices in the target network, and the device information includes one or more of interface configuration information, protocol configuration information, and service configuration information;
    an extraction module 502, configured to extract a plurality of knowledge graph triplets from the network data, where each knowledge graph triplet includes two network entities and a relationship between the two network entities, and a type of the network entity is a network device, an interface, a protocol, or a service; and
    a generation module 503, configured to generate a knowledge graph of the target network based on the plurality of knowledge graph triplets.

In conclusion, according to the data processing apparatus provided in this embodiment of this application, after obtaining the network data of the target network through the first obtaining module, a management device processes the network data, and generates the knowledge graph of the target network through the generation module. The knowledge graph of the target network can intuitively reflect the network entities in the target network and relationships among different network entities, that is, the knowledge graph can be used to visualize the network data. When needing to obtain network information in the target network, a user only needs to view the knowledge graph of the target network without manually querying a command line. Therefore, the efficiency of obtaining the network information by the user is improved.

Optionally, the device information further includes a routing entry.

Optionally, the relationship between the two network entities is a dependency relationship, a subordinate relationship, or an equivalence relationship.

Figure 6:
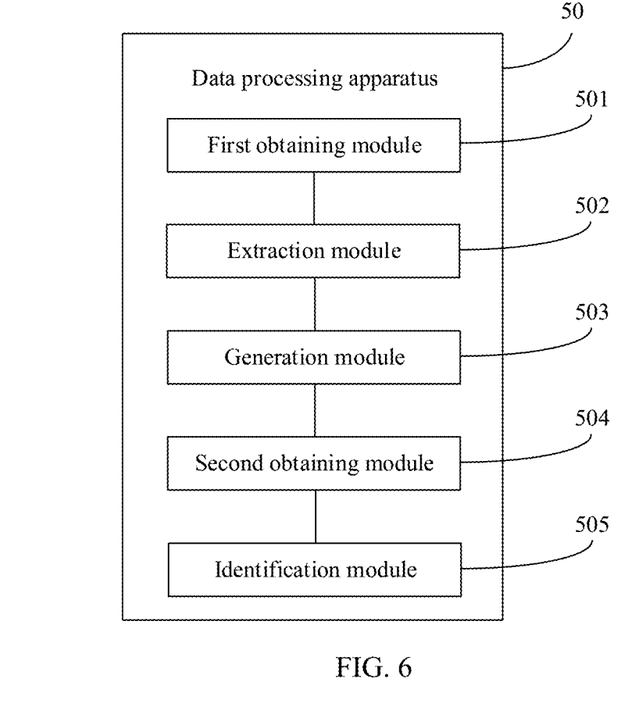
FIG. 6 is a schematic diagram of a structure of another data processing apparatus according to an embodiment of this application.

Optionally, as shown in FIG. 6, the apparatus 50 further includes:
    a second obtaining module 504, configured to: when a fault occurs in the target network, obtain abnormal events generated in the target network; and
    an identification module 505, configured to identify, on the knowledge graph of the target network, abnormal network entities that generated the abnormal events in the target network.

Optionally, the abnormal event includes one or more of an alarm log, a status change log, and an abnormal key performance indicator.

Figure 7:
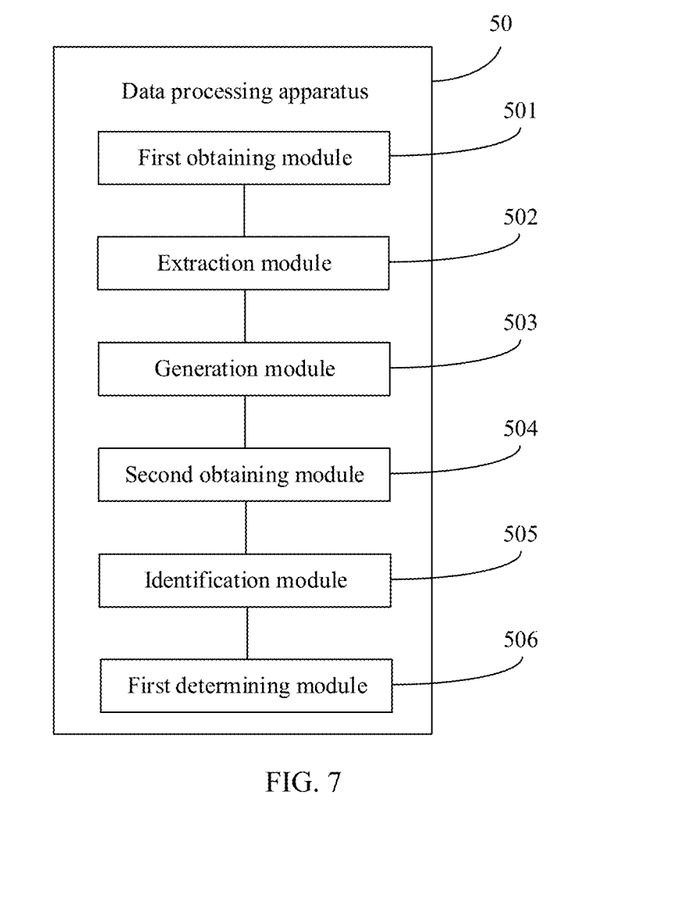
FIG. 7 is a schematic diagram of a structure of still another data processing apparatus according to an embodiment of this application.

Optionally, as shown in FIG. 7, the apparatus 50 further includes:
    a first determining module 506, configured to determine one or more root-cause fault network entities from the abnormal network entities on the knowledge graph of the target network based on a fault propagation relationship among network entities; and
    the identification module 505 is further configured to identify the one or more root-cause fault network entities on the knowledge graph of the target network.

Figure 8:
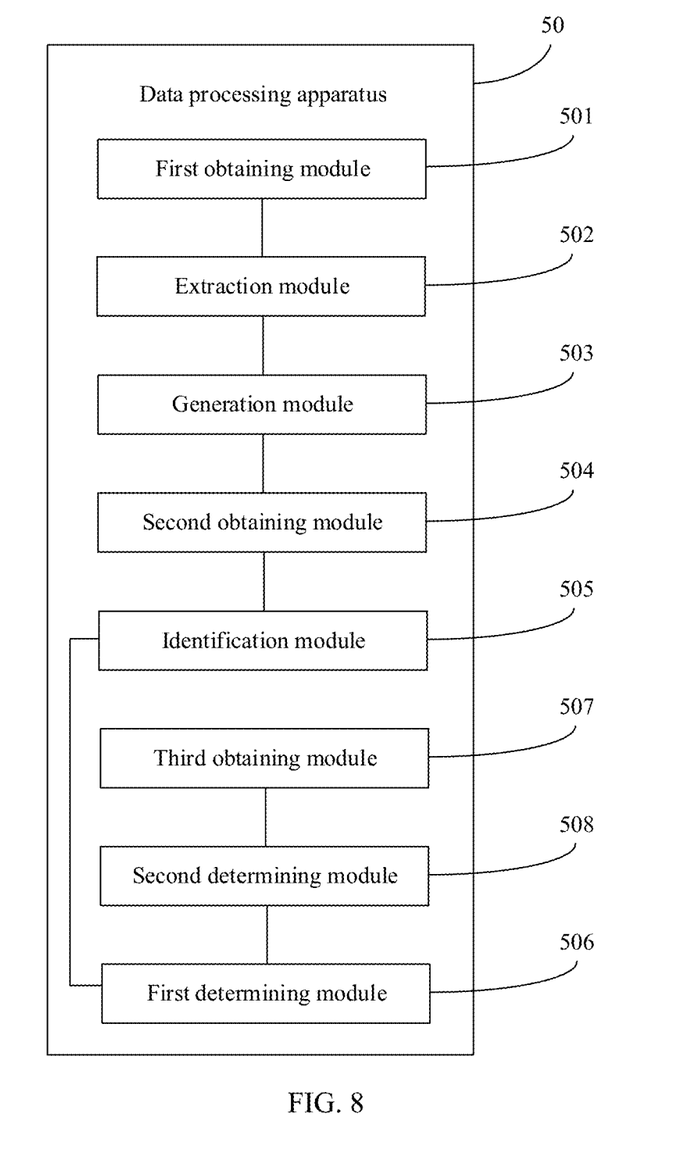
FIG. 8 is a schematic diagram of a structure of yet another data processing apparatus according to an embodiment of this application.

Optionally, as shown in FIG. 8, the apparatus 50 further includes:
    a third obtaining module 507, configured to obtain a plurality of knowledge graph samples, where each knowledge graph sample is identified with the abnormal network entities that generate, when a fault occurs in a network to which the knowledge graph sample belongs, abnormal events in the network to which the knowledge graph sample belongs and a root-cause fault network entity; and
    a second determining module 508, configured to determine the fault propagation relationship based on the plurality of knowledge graph samples.

Optionally, the network to which the knowledge graph sample belongs is the target network, or the network to which the knowledge graph sample belongs is another network of the same network type as the target network.

Optionally, the extraction module 502 is configured to:
    extract the plurality of knowledge graph triplets from the network data based on an abstract service model corresponding to the network type of the target network, where the abstract service model is used to represent the relationship among different network entities.

In conclusion, according to the data processing apparatus provided in this embodiment of this application, after obtaining the network data of the target network through the first obtaining module, the management device processes the network data, and generates the knowledge graph of the target network through the generation module. The knowledge graph of the target network can intuitively reflect the network entities in the target network and the relationship among different network entities, that is, the knowledge graph can be used to visualize the network data. When needing to obtain the network information in the target network, the user only needs to view the knowledge graph of the target network without manually querying the command line. Therefore, the efficiency of obtaining the network information by the user is improved. In addition, after a fault occurs in the target network, the management device may further identify the abnormal network entities on the knowledge graph of the target network through the identification module, to intuitively reflect abnormal locations in the target network. Further, the management device may further determine the root-cause fault network entity in the abnormal network entities on the knowledge graph of the target network through the first determining module based on the fault propagation relationship among network entities, to implement automated inference and locating of a network fault root cause.

Figure 9:
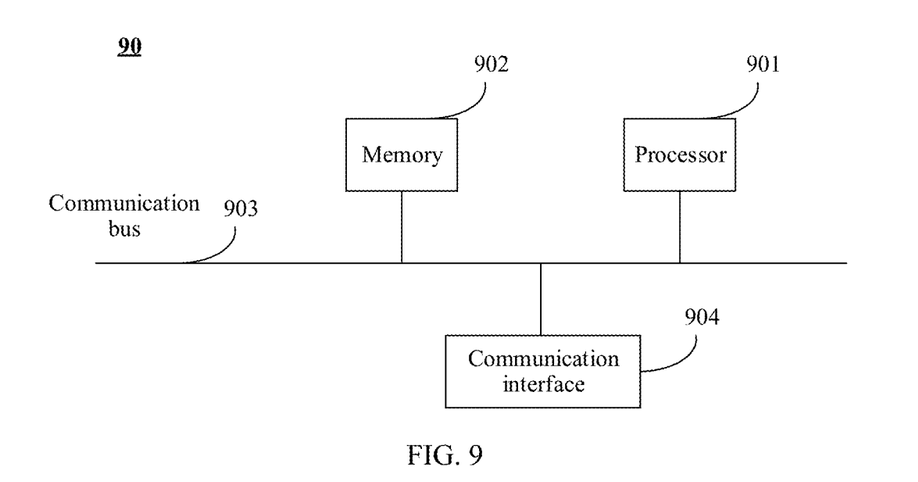
FIG. 9 is a block diagram of a data processing apparatus according to an embodiment of this application.

FIG. 9 is a block diagram of a data processing apparatus 90 according to an embodiment of this application. The data processing apparatus 90 may be the management device in the application scenario shown in FIG. 1. As shown in FIG. 9, the data processing apparatus 90 includes a processor 901 and a memory 902.

The memory 902 is configured to store a computer program, where the computer program includes program instructions.

The processor 901 is configured to invoke the computer program to implement the data processing method shown in FIG. 2.

Optionally, the data processing apparatus 90 further includes a communication bus 903 and a communication interface 904.

The processor 901 includes one or more processing cores, and the processor 901 executes various function applications and data processing by running the computer program.

The memory 902 may be configured to store the computer program. Optionally, the memory may store an operating system and at least one application program unit required by a function. The operating system may be a real time operating system (RTX), Linux, UNIX, Windows, OS X, or the like.

There may be a plurality of communication interfaces 904, and the communication interface 904 is configured to communicate with another device, for example, communicate with a control device or a network device.

The memory 902 and the communication interface 904 are separately connected to the processor 901 via the communication bus 903.

Figure 10:
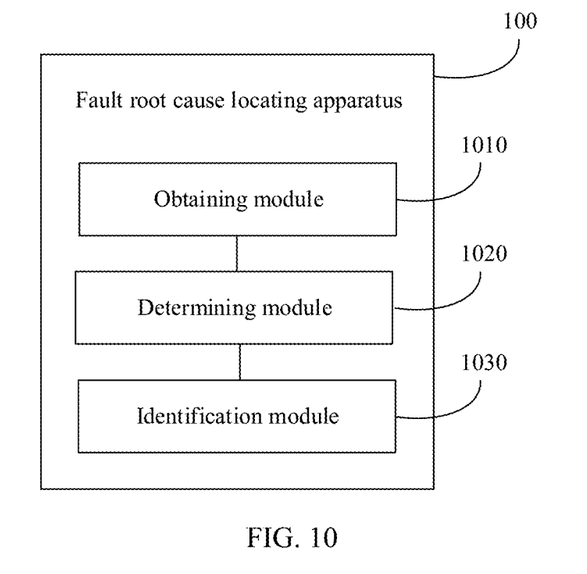
FIG. 10 is a schematic diagram of a structure of a fault root cause locating apparatus according to an embodiment of this application.

FIG. 10 is a schematic diagram of a structure of a fault root cause locating apparatus 100 according to an embodiment of this application. The fault root cause locating apparatus 100 may be applied to the management device 101 in the application scenario shown in FIG. 1. As shown in FIG. 10, the apparatus 100 includes:

an obtaining module 1010, configured to obtain a first knowledge graph of a target network in which a fault occurs, where the first knowledge graph is identified with abnormal network entities that generate abnormal events in the target network, and a type of a network entity on the first knowledge graph is a network device, an interface, a protocol, or a service, where specifically, the first knowledge graph may be received from another apparatus, or may be generated by performing steps 203 to 205; and in a process of generating the first knowledge graph, an initial knowledge graph may be first generated or may be received from another apparatus, and the abnormal network entities that generated the abnormal events in the target network are identified on the initial knowledge graph, to obtain the first knowledge graph; and a determining module 1020, configured to determine one or more root-cause fault network entities from the abnormal network entities on the first knowledge graph of the target network based on a fault propagation relationship among network entities.

The apparatus 100 may further include an identification module 1030, where the identification module is configured to identify the one or more root-cause fault network entities on the knowledge graph of the target network.

Further, the obtaining module 1010 is further configured to obtain a plurality of knowledge graph samples, where each knowledge graph sample is identified with the abnormal network entities that generate, when a fault occurs in a network to which the knowledge graph sample belongs, abnormal events in the network to which the knowledge graph sample belongs and a root-cause fault network entity. Correspondingly, the determining module 1020 is further configured to determine the fault propagation relationship based on the plurality of knowledge graph samples. The network to which the knowledge graph sample belongs is the target network, or the network to which the knowledge graph sample belongs is another network of the same network type as the target network.

An embodiment of this application further provides a computer storage medium. The computer storage medium stores instructions. When the instructions are executed by a processor, the data processing method shown in FIG. 2 is implemented.

A person of ordinary skill in the art may understand that all or some of the steps in the foregoing embodiments may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for description, but cannot be understood as an indication or implication of relative importance. The term "at least one" means one or more, and the term "a plurality of" means two or more, unless otherwise expressly limited.

The term "and/or" in this application describes only an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, improvement, or the like made within the concept and principle of this application should fall within the protection scope of this application.

What is claimed is:

1. A data processing method, comprising:
extracting a plurality of knowledge graph triplets from network data of a target network, wherein the network data comprises a network topology of the target network and device information of a plurality of network devices in the target network, and the device information comprises one or more selected from interface configuration information, protocol configuration information, or service configuration information, the interface configuration information comprises an internet protocol (IP) address of an interface, a protocol type supported by the interface, and a service type supported by the interface, the protocol configuration information comprises an identifier of a protocol to identify the protocol, each knowledge graph triplet comprises two network entities and a relationship between the two network entities, and a type of the network entities is a network device, an interface, a protocol, or a service;

generating a knowledge graph of the target network based on the plurality of knowledge graph triplets;

when a fault occurs in the target network, obtaining abnormal events generated in the target network;

identifying, on the knowledge graph of the target network, abnormal network entities that generated the abnormal events in the target network;

determining one or more root-cause fault network entities from the abnormal network entities on the knowledge graph of the target network based on a fault propagation relationship among network entities; and identifying the one or more root-cause fault network entities on the knowledge graph of the target network.

2. The method according to claim 1, wherein the device information further comprises a routing entry.

3. The method according to claim 1, wherein the relationship between the two network entities is a dependency relationship, a subordinate relationship, or an equivalence relationship.

4. The method according to claim 1, wherein the abnormal event comprises one or more alarm logs, a status change log, and an abnormal key performance indicator.

5. The method according to claim 1, wherein the method further comprises:

obtaining a plurality of knowledge graph samples, wherein each knowledge graph sample is identified with abnormal network entities that generate, when a fault occurs in a network to which the knowledge graph sample belongs, abnormal events in the network to which the knowledge graph sample belongs and a root-cause fault network entity; and determining the fault propagation relationship based on the plurality of knowledge graph samples.

6. The method according to claim 5, wherein the network to which the knowledge graph sample belongs is the target network, or the network to which the knowledge graph sample belongs is another network of a same network type as the target network.

7. The method according to claim 1, wherein the extracting a plurality of knowledge graph triplets from the network data comprises:

extracting the plurality of knowledge graph triplets from the network data based on an abstract service model corresponding to the network type of the target network, wherein the abstract service model is used to represent relationships among different network entities.

8. A data processing apparatus, wherein the apparatus comprises:

a processor; and a memory, coupled to the processor and configured to store instructions that when executed by the processor cause the apparatus to:

extract a plurality of knowledge graph triplets from network data of a target network, wherein the network data comprises a network topology of the target network and device information of a plurality of network devices in the target network, and the device information comprises one or more selected from interface configuration information, protocol configuration information, or service configuration information, the interface configuration information comprises an internet protocol (IP) address of an interface, a protocol type supported by the interface, and a service type supported by the interface, the protocol configuration information comprises an identifier of a protocol to identify the protocol, each knowledge graph triplet comprises two network entities and a relationship between the two network entities, and a type of the network entities is a network device, an interface, a protocol, or a service;

generate a knowledge graph of the target network based on the plurality of knowledge graph triplets;

when a fault occurs in the target network, obtain abnormal events generated in the target network;

identify, on the knowledge graph of the target network, abnormal network entities that generated the abnormal events in the target network;

determine one or more root-cause fault network entities from the abnormal network entities on the knowledge graph of the target network based on a fault propagation relationship among network entities; and identify the one or more root-cause fault network entities on the knowledge graph of the target network.

9. The apparatus according to claim 8, wherein the device information further comprises a routing entry.

10. The apparatus according to claim 8, wherein the relationship between the two network entities is a dependency relationship, a subordinate relationship, or an equivalence relationship.

11. The apparatus according to claim 8, wherein the abnormal event comprises one or more of alarm logs, a status change log, and an abnormal key performance indicator.

12. The apparatus according to claim 8, wherein when executed by the processor, the instructions further cause the apparatus to:

obtain a plurality of knowledge graph samples, wherein each knowledge graph sample is identified with abnormal network entities that generate, when a fault occurs in a network to which the knowledge graph sample belongs, abnormal events in the network to which the knowledge graph sample belongs and a root-cause fault network entity; and determine the fault propagation relationship based on the plurality of knowledge graph samples.

13. A fault root cause locating method, comprising:

obtaining a first knowledge graph of a target network in which a fault occurs, wherein the first knowledge graph is identified with abnormal network entities that generate abnormal events in the target network, and a type of a network entity on the first knowledge graph is a network device, an interface, a protocol, or a service;

identifying, on an initial knowledge graph of the target network, the abnormal network entities that generated the abnormal events in the target network, to obtain the first knowledge graph, wherein the initial knowledge graph is generated based on network data of the target network, the network data comprises a network topology of the target network and device information of a plurality of network devices in the target network, the device information comprises one or more selected from interface configuration information, protocol configuration information, or service configuration information, the interface configuration information comprises an internet protocol (IP) address of an interface, a protocol type supported by the interface, and a service type supported by the interface, and the protocol configuration information comprises an identifier of a protocol to identify the protocol;

determining one or more root-cause fault network entities from the abnormal network entities on the first knowledge graph of the target network based on a fault propagation; and identifying the one or more root-cause fault network entities on the knowledge graph of the target network.

14. A fault root cause locating apparatus, wherein the apparatus comprises:

a processor; and a memory, coupled to the processor and configured to store instructions that when executed by the processor cause the data processing apparatus to:

obtain a first knowledge graph of a target network in which a fault occurs, wherein the first knowledge graph is identified with abnormal network entities that generate abnormal events in the target network, and a type of a network entity on the first knowledge graph is a network device, an interface, a protocol, or a service;

identify, on an initial knowledge graph of the target network, the abnormal network entities that generated the abnormal events in the target network, to obtain the first knowledge graph, wherein the initial knowledge graph is generated based on network data of the target network, the network data comprises a network topology of the target network and device information of a plurality of network devices in the target network, the device information comprises one or more selected from interface configuration information, protocol configuration information, or service configuration information, the interface configuration information comprises an internet protocol (IP) address of an interface, a protocol type supported by the interface, and a service type supported by the interface, and the protocol configuration information comprises an identifier of a protocol to identify the protocol;

determine one or more root-cause fault network entities from the abnormal network entities on the first knowledge graph of the target network based on a fault propagation; and identify the one or more root-cause fault network entities on the knowledge graph of the target network.

* * * * *

UNITED STATES PATENT AND TRADEMARK OFFICE
CERTIFICATE OF CORRECTION

| | | |
|---|---|---|
| PATENT NO. | : 12,015,519 B2 | Page 1 of 1 |
| APPLICATION NO. | : 17/691736 | |
| DATED | : June 18, 2024 | |
| INVENTOR(S) | : Zhongyu Wang et al. | |

It is certified that error appears in the above-identified patent and that said Letters Patent is hereby corrected as shown below:

In the Claims

In Column 17, Line 8, in Claim 13, delete "propagation;" and insert -- propagation relationship among network entities; --.

In Column 18, Line 20, in Claim 14, delete "propagation;" and insert -- propagation relationship among network entities; --.

Signed and Sealed this
Tenth Day of September, 2024

*Katherine Kelly Vidal*

Katherine Kelly Vidal
*Director of the United States Patent and Trademark Office*